(12) United States Patent
Desai et al.

(10) Patent No.: US 10,694,741 B2
(45) Date of Patent: Jun. 30, 2020

(54) AGROCHEMICAL COMPOSITIONS HAVING INCREASED RAINFASTNESS

(71) Applicant: UPL LIMITED, Haldia (IN)

(72) Inventors: Sujata Dhondiram Desai, Mumbai (IN); Satish Ekanath Bhoge, Mumbai (IN); Jaidev Rajnikant Shroff, Mumbai (IN); Vikram Rajnikant Shroff, Mumbai (IN)

(73) Assignee: UPL LIMITED, Haldia (IN)

( * ) Notice: Subject to any disclaimer, the term of this patent is extended or adjusted under 35 U.S.C. 154(b) by 0 days.

(21) Appl. No.: 15/029,785

(22) PCT Filed: Oct. 31, 2014

(86) PCT No.: PCT/IB2014/065728
§ 371 (c)(1),
(2) Date: Apr. 15, 2016

(87) PCT Pub. No.: WO2015/083017
PCT Pub. Date: Jun. 11, 2015

(65) Prior Publication Data
US 2016/0270392 A1   Sep. 22, 2016

(30) Foreign Application Priority Data

Dec. 5, 2013  (IN) .......................... 1378/KOL/2013

(51) Int. Cl.
| A01N 25/30 | (2006.01) |
| A01N 25/24 | (2006.01) |
| A01N 25/02 | (2006.01) |
| A01N 25/08 | (2006.01) |
| A01N 47/14 | (2006.01) |
| A01N 47/08 | (2006.01) |
| A01N 47/18 | (2006.01) |
| A01N 43/54 | (2006.01) |

(52) U.S. Cl.
CPC ............ *A01N 25/30* (2013.01); *A01N 25/02* (2013.01); *A01N 25/08* (2013.01); *A01N 25/24* (2013.01); *A01N 43/54* (2013.01); *A01N 47/08* (2013.01); *A01N 47/14* (2013.01); *A01N 47/18* (2013.01)

(58) Field of Classification Search
None
See application file for complete search history.

(56) References Cited

U.S. PATENT DOCUMENTS

| 6,727,204 B1 * | 4/2004 | Bergeron ............... A01N 25/24 |
| | | 424/484 |
| 7,004,991 B2 | 2/2006 | Narayanan et al. |

FOREIGN PATENT DOCUMENTS

| CN | 101015299 | * | 8/2007 | |
| CN | 101554161 | | 10/2009 | |
| CN | 101637169 | * | 2/2010 | |
| CN | 101637170 | * | 2/2010 | |
| CN | 102217620 | * | 10/2011 | |
| CN | 102239863 | * | 11/2011 | |
| CN | 102258039 | * | 11/2011 | |
| CN | 103190423 | | 7/2013 | |
| EP | 0245970 A1 | | 11/1987 | |
| EP | 0950354 B1 | | 6/2002 | |
| FR | 2777421 A1 | * | 10/1999 | ............ A01N 25/04 |
| WO | WO-9615107 A1 | * | 5/1996 | ............ A01N 47/44 |
| WO | WO 2000056147 | * | 9/2000 | |

OTHER PUBLICATIONS

International Search Report dated Jan. 16, 2015 in PCT/IB2014/065728.

Bringe et al.; "Retention and Rainfastness of Mancozeb as Affected by Physiochemical Characteristics of Adaxial Apple Leaf Surface after Enhanced UV-B Radiation"; Journal of Environmental Science and Health, Part B: Pesticides, Food Contaminants, and Agricultural Wastes; 42:2, 133-141, (2007).

* cited by examiner

*Primary Examiner* — Alton N Pryor
(74) *Attorney, Agent, or Firm* — Cantor Colburn LLP

(57) ABSTRACT

The present invention relates to agrochemical combinations having enhanced rainfastness comprising a dithiocarbamate, a polycarboxylate salt and optionally one or more pesticides and/or a plant growth regulator and/or a micronutrient.

5 Claims, No Drawings

AGROCHEMICAL COMPOSITIONS HAVING INCREASED RAINFASTNESS

FIELD OF THE INVENTION

The present invention relates to agricultural combinations having enhanced rainfastness comprising a dithiocarbamate, a polycarboxylate salt and optionally one or more pesticides and/or a plant growth regulator and/or a micronutrient. The present invention relates to agricultural compositions having enhanced rainfastness comprising a dithiocarbamate, a polycarboxylate salt and optionally one or more pesticides and/or a plant growth regulator and/or a micronutrient. A process for preparing compositions having enhanced rainfastness comprising a dithiocarbamate, a polycarboxylate salt and optionally one or more pesticides and/or a plant growth regulator and/or a micronutrient and a method of using such compositions effectively has also been described.

BACKGROUND OF THE INVENTION

Different formulations applicable to agrochemicals vary according to purpose of the application, nature of the active ingredients, kind of other components like surfactants, adjuvants etc. Out of the many challenges that one has to overcome to come up with a better performing agrochemical composition, certain properties are critical in determining the performance. Rainfastness is one such property as most of the active ingredients tend to be washed off by rain.

A pesticide is considered rainfast, if it has been adsorbed/absorbed by plant surface so that it will still remain available after rainfall or irrigation. The degree of rainfastness of pesticides is highly variable and depends on the physico-chemical properties of the active ingredient. Rainfall can adversely affect a pesticide application by directly washing the pesticide away or physically removing it, or diluting the product to a less effective form. Redistribution of the active ingredient can also happen after a rainfall so that the active ingredient may remain less available.

Dithiocarbamates are the most widely used fungicides. Examples include mancopper, maneb, mancozeb, metiram, propineb and zineb.

J. Environ Sci Health B. 2007, 133-41 discloses a study on retention and rainfastness of mancozeb as affected by physicochemical characteristics of adaxial apple leaf surface after enhanced UV-B radiation.

The rain fastness of dithiocarbamates in dry form is enhanced by formulation with nonionic water-soluble polymers such as hydroxyl ($C_2$-$C_5$) alkyl cellulose, polyethylene oxide, polyvinyl alcohol, polyvinyl pyrrolidone as disclosed in EP 0245970. However use of these high molecular weight polymers often causes severe formulation problems such low suspensibility and aggregation which in turn will result in degrading of the physical/chemical properties of the composition.

EP 0950354 discloses use of low molecular weight polyvinyl alcohol to improve the physical properties of dithiocarbamate based compositions.

All the prior arts described herein experience serious drawbacks especially while making the formulation. Use of high molecular weight polymers with dithiocarbamates usually leads to flocculation problems. Dry formulations face low suspensibility and aggregation while aqueous suspensions have gelation problems.

Therefore, there is a need for compositions comprising one or more active ingredients with increased rainfastness while maintaining the physico-chemical properties of the composition.

Surprisingly inventors of the present invention found out that a combination comprising pesticides such as dithiocarbamates and polycarboxylates impart increased rainfastness as well as improved performance.

OBJECTS OF THE INVENTION

Accordingly, it is an object of the present invention to provide agrochemical combinations of dithiocarbamates and a polycarboxylate salt having enhanced rainfastness.

It is another object of the present invention to provide agrochemical compositions having enhanced rainfastness comprising a combination of a dithiocarbamate and a polycarboxylate salt.

Yet another object of the present invention is to provide an agrochemical composition comprising dithiocarbamates, a polycarboxylate salt and optionally a pesticide and/or a plant growth regulator and/or a micronutrient.

It is an object of the present invention to provide a process for the preparation of an agrochemical composition with enhanced rainfastness comprising dithiocarbamates, a polycarboxylate salt and optionally a pesticide and/or a plant growth regulator and/or a micronutrient.

Another object of the present invention relates to the use of polycarboxylates as rainfastness agents.

Additionally, it is an object of the invention to provide an agrochemical composition which is less susceptible to rain drop wash off.

It is an object of the present invention to provide an agrochemical composition that is made available to a plant, its habitat, plant seed or soil in an agrochemically effective amount for longer time.

SUMMARY OF THE INVENTION

The present invention relates to agricultural combinations having enhanced rainfastness comprising dithiocarbamate, a polycarboxylates salt and optionally one or more pesticides and/or a plant growth regulator and/or a micronutrient.

The present invention relates to agricultural compositions having enhanced rainfastness comprising a dithiocarbamate, a polycarboxylate salt and optionally one or more pesticides and/or a plant growth regulator and/or a micronutrient.

Further there is provided a process for the preparation of compositions having enhanced rainfastness comprising dithiocarbamates, a polycarboxylates salt and optionally one or more pesticides and/or a plant growth regulator and/or a micronutrient.

In another aspect there is provided a method of using such compositions effectively.

DETAILED DESCRIPTION OF THE INVENTION

Rainfastness is the property of an active ingredient to remain available for comparatively longer time when exposed to wet, windy or rainy conditions. It relates to the ability of a particular ingredient for example pesticide to remain on foliage, seed or soil after rain or heavy dew and is measured as the percentage of the applied pesticide which remains on the crop after a certain amount of rain. Rainfastness lead to a long lasting activity of the ingredient under adverse weather conditions such as rain or wind which in turn will impart the low rate of use of the active ingredient as well as longer gap of time between applications. Accordingly there is a need to develop compositions exhibiting rainfastness at the same time are better performing and having excellent physico-chemical properties.

Inventors of the present invention studied of effect of rain on composition comprising a dithiocarbamate alone as well as with one or more other active ingredients. It has been observed that compositions comprising a dithiocarbamate alone or with other active ingredients such as strobilurin fungicides are susceptible to raindrop wash off and are adversely affecting the disease control.

Inventors of the present invention surprisingly found out that a combination of dithiocarbamates, polycarboxylates, and other pesticides and/or a plant growth regulator and/or a micronutrient impart increased rainfastness as well as improved performance.

Accordingly, there is provided agrochemical combinations of dithiocarbamates and a polycarboxylate salt. There is also provided novel rainfast agricultural compositions comprising dithiocarbamate and a polycarboxylate salt.

In another embodiments, the combinations or the compositions described above may additionally comprise at least another pesticide and/or a plant growth regulator and/or a micronutrient that are susceptible to raindrop wash off.

The dithiocarbamates of the present invention comprise broad-spectrum, non-systemic (contact) fungicides including their derivatives which have activity against phytopathogenic fungi. They are useful in control of many fungal diseases in a wide range of field crops, fruit (e.g. apples, pears, grapes, citrus etc)., nuts, vegetables (tomatoes, eggplant etc.), potatoes, ornamentals, etc. which have been infected or suspected of being infected, with pathogenic fungi. They exhibit controlling effects on diseases such as powdery mildew, downy mildew, anthracnose, scab, black spot, melanose, late blight, early blight, blast, sheath blight, damping-off, southern blight etc. More frequent uses include control of early and late blights (*Phytophthora infestans* and *Alternaria solani*) of potatoes and tomatoes, downy mildew (*Plasmopara viticola*) and black rot (*Guignardia bidwellii*) of vines, downy mildew (*Pseudoperonospora cubensis*) of cucurbits, scab (*Venturia inaequalis*) of apples, Sigatoka (*Mycosphaerella* spp.) of bananas, and melanose (*Diaporthe citri*) of citrus.

Dithiocarbamates are a class of compounds that can be washed off easily by rain. Preferred dithiocarbamates of the present invention are ethylenebisdithiocarbamates and their metal salts and/or metal coordination products. Preferably the dithiocarbamates including derivatives and salts of the present invention is selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb.

Accordingly, there is provided agrochemical combinations comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb; and at least one polycarboxylate salt.

In another embodiment, there is provided agricultural compositions comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb; and at least one polycarboxylate salt.

In an embodiment, the dithiocarbamate is mancozeb.

Accordingly, in an embodiment, the present invention provides agrochemical combinations comprising mancozeb and at least one polycarboxylate salt.

In another embodiment, there is provided agricultural compositions comprising mancozeb and at least one polycarboxylate salt.

The composition according to the present invention contains polycarboxylate salts as rainfastness agent.

Examples of suitable polycarboxylate salts include alkali metal salts such sodium and potassium. Potassium polycarboxylate of the present invention comprises a polymer of maleic acid potassium salt. Sodium polycarboxylate of the present invention comprises a polymer of maleic acid sodium salt.

Accordingly, in an embodiment, the present invention provides agrochemical combinations comprising mancozeb and at least one polycarboxylate salt selected from sodium polycarboxylate and potassium carboxylate.

In another embodiment, there is provided agricultural compositions comprising mancozeb and at least one polycarboxylate salt selected from sodium polycarboxylate and potassium polycarboxylate.

In an embodiment, the combinations and/or compositions described hereinabove comprise at least a second pesticide. The second pesticide may include pesticides and/or a plant growth regulator and/or a micronutrient.

Examples of such second pesticides include insecticides, herbicides, fungicides and the like.

Examples of such fungicides are a chemical class of fungicides including their derivatives, wherein the fungicide is selected from a systemic or contact fungicide. Examples of such chemical class include strobilurin fungicides, acylamino acid fungicides, benzimidazole fungicides, conazole fungicides, aromatic fungicides, carbamate fungicides, sulfonamide fungicides, organophosphorus fungicides, aliphatic nitrogen fungicides etc.

Accordingly, in an embodiment, there is provided agrochemical combinations comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb; at least one second fungicide selected from the group consisting of strobilurin fungicides, acylamino acid fungicides, benzimidazole fungicides, conazole fungicides, aromatic fungicides, carbamate fungicides, sulfonamide fungicides, organophosphorus fungicides and aliphatic nitrogen fungicides; and at least one polycarboxylate salt.

In another embodiment, there is provided agricultural compositions comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb; at least one second fungicide selected from the group consisting of strobilurin fungicides, acylamino acid fungicides, benzimidazole fungicides, conazole fungicides, aromatic fungicides, carbamate fungicides, sulfonamide fungicides, organophosphorus fungicides and aliphatic nitrogen fungicides; and at least one polycarboxylate salt.

Examples of strobilurin fungicide include azoxystrobin, fluoxastrobin, coumoxystrobin, picoxystrobin, dimoxystrobin, orysastrobin, pyraclostrobin, kresoxim-methyl, and trifloxystrobin.

Examples of acylamino fungicides include metalaxyl, metalaxyl-M, benalaxyl, benalaxyl-M, and furalaxyl.

Examples of anilide fungicide include boscalid, carboxin, fenhexamid, fluxapyroxad, isotianil, penflufen, sedaxane, thifluzamide.

Examples of benzimidazole fungicides include carbendazim, chlorfenazol and cypendazole and benzimidazole precursor fungicides like thiophanate and thiophanate-methyl.

Examples of conazole fungicides include hexaconazole, epoxyconazole, flutriafol, ipconazole, metconazole, prothioconazole, propiconazole, tebuconazole and difenconazole.

Examples of aromatic fungicides include chlorothalonil.

Examples of carbamate fungicides include thiophanate and thiophanate-methyl.

Examples of imidazolefungicides include iprodione and cyazofamid.

Examples of organophosphorus fungicides include fosetyl.

Examples of aliphatic nitrogen fungicides include cymoxanil.

Strobilurin fungicides are a class of fungicides with protectant, curative, eradicant, translaminar and systemic properties. They also inhibit spore germination and mycelial growth, and also show antisporulant activity. They exhibit controlling effects on pathogens such as, *Erysiphe graminis, Puccinia* spp., *Leptosphaeria nodorum, Septoria tritici* and *Pyrenophora teres* on temperate cereals; *Pyricularia oryzae* and *Rhizoctonia solani* on rice. In addition since they possess a systemic activity, it is also possible to control diseases of the stem and leaf by soil treatment.

In an embodiment, the strobilurin fungicide is azoxystrobin.

Accordingly, in an embodiment, the present invention provides agrochemical combinations comprising mancozeb, azoxystrobin and at least one polycarboxylate salt selected from sodium polycarboxylate and potassium carboxylate.

In another embodiment, there is provided agricultural compositions comprising mancozeb, azoxystrobin and at least one polycarboxylate salt selected from sodium polycarboxylate and potassium polycarboxylate.

Examples of plant growth regulator include fertilizers such as compounds of nitrogen, phosphorus, potassium and sulfur.

Examples of micronutrients include, but not limited to compounds such as salts and oxides of zinc, nickel, molybdenum, copper, boron, calcium, manganese, iron, magnesium etc.

The compositions that are prepared based on the present invention include both solid and liquid based compositions.

Solid compositions include dry flowables like wettable powders and water dispersible granules. Liquid formulations include suspension concentrates, suspo-emulsions and oil dispersions.

In an embodiment of the present invention there is provided a composition comprising a dithiocarbamate and a polycarboxylate salt.

According to an embodiment of the invention, the dithiocarbamates including derivatives and salts of the present invention is selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb The composition contains from about 1% to 80% by weight of the dithiocarbamate, preferably it is from about 30% to about 75% by weight of the composition.

The composition according to the present invention contains polycarboxylate salts as rainfastness agent.

In an embodiment of the present invention, the composition contains from about 0.01% to about 7% by weight of polycarboxylate salt, preferably it is from about 0.01% to about 5% by weight of the composition.

Accordingly, there is provided agrochemical combinations comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb, in an amount of about 1% to about 80% by weight of the combination; and at least one polycarboxylate salt in an amount of about 0.01 to about 7% of the combination.

In another embodiment, there is provided agricultural compositions comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb, in an amount of about 1% to about 80% by weight of the composition; and at least one polycarboxylate salt in an amount of about 0.01 to about 7% of the composition.

Accordingly, in an embodiment, the present invention provides agrochemical combinations comprising mancozeb in an amount of about 1% to about 80% by weight of the combination and at least one polycarboxylate salt in an amount of about 0.01 to about 7% of the combination.

In another embodiment, there is provided agricultural compositions comprising mancozeb in an amount of about 1% to about 80% by weight of the composition and at least one polycarboxylate salt in an amount of about 0.01 to about 7% of the composition.

In an embodiment the formulations comprising a dithiocarbamate and a polycarboxylate salt include both solid and liquid based formulations.

According to another embodiment of the present invention, the composition is preferably formulated as a solid composition including, but not limited to, dust, powder, granules, pellets, tablets, dry flowable, wettable powder or water dispersible granules.

In another embodiment, the present invention describes a process for the preparation of a solid fungicidal composition comprising a dithiocarbamate and a polycarboxylate salt, said process comprising:

1) mixing a dithiocarbamate, a polycarboxylate salt and other adjuvants/surfactants in a vessel by suitable means to form a slurry; and
2) granulating the slurry obtained in step 1 at a predetermined temperature to desired granule size.

The granulation techniques of step (2) include fluidized-bed granulation, spray drying, pan agglomeration and extrusion.

In another embodiment, the present invention provides a composition comprising:
a) a dithiocarbamate, derivative or salt thereof;
b) a polycarboxylate salt;

c) optionally an active ingredient selected from one or more pesticides and/or a plant growth regulator and/or a micronutrient; and d) other agrochemical adjuvants/surfactants.

According to an embodiment of the invention, the dithiocarbamates including derivatives and salts of the present invention is selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb.

According to an embodiment of the invention, the composition comprises from about 1% to about 80% by weight of the dithiocarbamate, preferably it is from about 30% to about 75%.

The composition according to the present invention contains polycarboxylate salts as rainfastness agent.

According to another embodiment, the composition according to the present invention contains from about 0.01 to about 7% by weight of polycarboxylate salt, preferably it is from about 0.01% to about 5%.

The active ingredient that is added along with the dithiocarbamates and polycarboxylate salts of the present invention is selected from a pesticide such as an insecticide, herbicide and fungicide.

Preferably the pesticide that is added along with the dithiocarbamates and polycarboxylate salts of the present invention is a fungicide.

For example, the non-systemic dithiocarbamate is combined with a systemic fungicide.

According to an embodiment of the invention, the composition comprises from about 1% to about 40% by weight of the pesticide, preferably it is from about 1% to about 30%.

Accordingly, in this embodiment, there is provided agrochemical combinations comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb, in an amount of about 1% to about 80% by weight of the combination; at least a second pesticide in an amount of about 1% to about 40% by weight of the combination; and at least one polycarboxylate salt in an amount of about 0.01 to about 7% of the combination.

In another embodiment, there is provided agricultural compositions comprising at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb, more preferably mancozeb, in an amount of about 1% to about 80% by weight of the composition; at least a second pesticide in an amount of about 1% to about 40% by weight of the composition; and at least one polycarboxylate salt in an amount of about 0.01 to about 7% of the composition.

According to an embodiment of the invention, the fungicide to be combined with dithiocarbamate and polycarboxylate salt of the present invention is selected from strobilurin fungicides, acylamino acid fungicides, benzimidazole fungicides, conazole fungicides, aromatic fungicides, carbamate fungicides, sulfonamide fungicides, organophosphorus fungicides, aliphatic nitrogen fungicides.

According to an embodiment of the invention the fungicide that is combined with dithiocarbamate and polycarboxylate salt of the present invention is selected from azoxystrobin, fluoxastrobin, coumoxystrobin, picoxystrobin, dimoxystrobin, orysastrobin, pyraclostrobin, kresoxim-methyl, trifloxystrobin, metalaxyl, metalaxyl-M, benalaxyl, benalaxyl-M, furalaxyl, boscalid, carboxin, fenhexamid, fluxapyroxad, isotianil, penflufen, sedaxane, thifluzamide, carbendazim, chlorfenazol, cypendazole, thiophanate, thiophanate-methyl, hexaconazole, epoxyconazole, flutriafol, ipconazole, metconazole, prothioconazole, propiconazole, tebuconazole, difenconazole, chlorothalonil, iprodione, cyazofamid, fosetyl and cymoxanil.

Accordingly, in this embodiment, there is provided agrochemical combinations comprising:
(a) at least one dithiocarbamate selected from the group consisting of amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
(b) at least a second pesticide selected from the group consisting of azoxystrobin, fluoxastrobin, coumoxystrobin, picoxystrobin, dimoxystrobin, orysastrobin, pyraclostrobin, kresoxim-methyl, trifloxystrobin, metalaxyl, metalaxyl-M, benalaxyl, benalaxyl-M, furalaxyl, boscalid, carboxin, fenhexamid, fluxapyroxad, isotianil, penflufen, sedaxane, thifluzamide, carbendazim, chlorfenazol, cypendazole, thiophanate, thiophanate-methyl, hexaconazole, epoxyconazole, flutriafol, ipconazole, metconazole, prothioconazole, propiconazole, tebuconazole, difenconazole, chlorothalonil, iprodione, cyazofamid, fosetyl and cymoxanil; and
(c) at least one polycarboxylate salt selected from sodium polycarboxylate and potassium polycarboxylate.

In an embodiment of the present invention the fungicide that is added in combination with dithiocarbamates of the present invention is selected from a systemic fungicide such as strobilurin fungicide.

Examples of strobilurin fungicide include azoxystrobin, fluoxastrobin, coumoxystrobin, picoxystrobin, dimoxystrobin, orysastrobin, pyraclostrobin, kresoxim-methyl, and trifloxystrobin, preferably it is selected from azoxystrobin, pyraclostrobin, kresoxim-methyl and trifloxystrobin.

The composition contains from about 1% to about 80% by weight of the dithiocarbamate, from about 0.01% to about 7% by weight of polycarboxylate salt and from about 1% to about 25% by weight of strobilurin fungicide.

Preferably the composition contains from about 40% to about 75% by weight of the dithiocarbamate, from about 0.01% to about 5% by weight of polycarboxylate salt and from about 3% to about 15% by weight of strobilurin fungicide.

The formulations that are prepared based on the present invention include both solid and liquid based formulations.

In an embodiment of the present invention, the composition is preferably formulated as a solid composition including, but not limited to, dust, powder, granules, pellets, tablets, dry flowable, wettable powder or water dispersible granules.

In yet another embodiment of the present invention there is provided a process for the preparation of a solid agricultural composition comprising a dithiocarbamate, a polycarboxylate salt and optionally one or more pesticides and/or plant growth regulator and/or micronutrient, said process comprising:

1) mixing a dithiocarbamate, a polycarboxylate salt and other surfactants in a vessel by suitable means to form a slurry;
2) optionally adding another pesticide and/or plant growth regulator and/or micronutrient in the form of slurry;
3) mixing the slurry of step 1 and 2; and
4) granulating the slurry obtained step 3 at predetermined temperature to desired granule size.

The granulation techniques of step (4) include fluidized-bed granulation, spray drying, pan agglomeration and extrusion.

In another embodiment of the present invention, the active ingredient that is added in combination with dithiocarbamates of the present invention is selected from a benzimidazole fungicide such as carbendazim. Accordingly there is provided a composition comprising mancozeb, carbendazim and potassium/sodium polycarboxylate. The composition contains from about 1% to about 80% by weight of the mancozeb, more preferably from about 50% to about 75%, from about 1% to about 25% by weight of the carbendazim, more preferably from about 3% to about 15% and from about 0.01% to about 7% by weight of polycarboxylate salt and more preferably from about 0.01% to about 5%.

In another embodiment of the present invention the active ingredient that is added in combination with dithiocarbamates of the present invention is selected from a conazole fungicide such as hexaconazole. Accordingly there is provided a composition comprising mancozeb, hexaconazole and potassium/sodium polycarboxylate. The composition contains from about 1% to about 80% by weight of the mancozeb, more preferably from about 50% to about 75%, about 1% to about 10% by weight of the hexaconazole, more preferably from about 1% to about 5% and from about 0.01% to about 7% by weight of polycarboxylate salt and more preferably from about 0.01% to about 5%.

In yet another embodiment of the present invention the active ingredient that is added in combination with dithiocarbamates of the present invention is selected from an aromatic fungicide such as chlorothalonil. Accordingly there is provided a composition comprising mancozeb, chlorothalonil and potassium/sodium polycarboxylate. The composition contains from about 1% to about 80% by weight of the mancozeb, more preferably from about 50% to about 70%, about 1% to about 25% by weight of the chlorothalonil, more preferably from about 3% to about 15% and from about 0.01% to about 7% by weight of polycarboxylate salt and more preferably from about 0.01% to about 5%.

According to another embodiment of the present invention the active ingredient that is added in combination with dithiocarbamates of the present invention is selected from a carbamate fungicide such as thiophanate-methyl. Accordingly there is provided a composition comprising mancozeb, thiophanate-methyl and potassium/sodium polycarboxylate. The composition contains from about 1% to about 80% by weight of the mancozeb, more preferably from about 30% to about 70%, from about 1% to about 40% by weight of the thiophanate-methyl, more preferably from about 15% to about 30% and from about 0.01% to about 7% by weight of polycarboxylate salt and more preferably from about 0.01% to about 5%.

In an embodiment of the present invention the active ingredient that is added in combination with dithiocarbamates of the present invention is selected from a sulfonamide fungicide such as cyazofamid. Accordingly there is provided a composition comprising mancozeb, cyazofamid and potassium/sodium polycarboxylate. The composition contains from about 1% to about 80% by weight of the mancozeb, more preferably from about 50% to about 70%, about 1% to about 15% by weight of the cyazofamid, more preferably from about 1% to about 10% and from about 0.01% to about 7% by weight of polycarboxylate salt and more preferably from about 0.01% to about 5%.

In yet another embodiment of the present invention the active ingredient that is added in combination with dithiocarbamates of the present invention is selected from an organophosphorus fungicide such as fosetyl. Accordingly there is provided a composition comprising mancozeb, fosetyl and potassium/sodium polycarboxylate. The composition contains from about 1% to about 70% by weight of the mancozeb, more preferably from about 30% to about 70%, about 1% to about 40% by weight of the fosetyl, more preferably from about 20% to about 40% and from about 0.01% to about 7% by weight of polycarboxylate salt and more preferably from about 0.01% to about 5%.

In yet another embodiment of the present invention the active ingredient that is added in combination with dithiocarbamates of the present invention is selected from an aliphatic nitrogen fungicide such as cymoxanil. Accordingly there is provided a composition comprising mancozeb, cymoxanil and potassium/sodium polycarboxylate. The composition contains from about 1% to about 80% by weight of the mancozeb, more preferably from about 50% to about 70%, about 1% to about 20% by weight of the chlorothalonil, more preferably from about 3% to about 10% and from about 0.01% to about 7% by weight of polycarboxylate salt and more preferably from about 0.01% to about 5%.

According to another embodiment of the present invention, growth regulator/micronutrient that is added in combination with dithiocarbamates is the complex of zinc with ethylene diamine tetra acetic acid. Accordingly there is provided a composition comprising mancozeb, potassium/sodium polycarboxylate and complex of zinc with ethylene diamine tetra acetic acid. The composition contains from about 1% to about 80% by weight of the mancozeb, more preferably from about 50% to about 70%, about 1% to about 20% by weight of the complex of zinc with ethylene diamine tetra acetic acid, more preferably from about 3% to about 15% and from about 0.01% to about 7% by weight of polycarboxylate salt and more preferably from about 0.01% to about 5%.

In an embodiment the compositions according to the present invention include both solid and liquid based formulations.

Preferably the compositions according to the present invention is formulated as a solid composition including, but not limited to, dust, powder, granules, pellets, tablets, dry flowable, wettable powder or water dispersible granules.

Preferred liquid formulations include suspension concentrates, suspo-emulsions and oil dispersions.

The compositions according to the present invention comprise one or more surfactants selected from wetting agent, defoamer, dispersing agent, viscosity modifier, emulsifier, antifreeze agent, biocide and combinations thereof.

Preferably, the compositions according to the present invention comprise at least one surfactant selected from at least one wetting agent, at least one defoamer, at least one dispersing agent, and combinations thereof. The composition content of these surfactants is not particularly limiting and may be determined by a skilled technician in the art according to the conventional protocols.

According to an embodiment of the present invention, the wetting agent is selected from but not limited to non-ionic surfactants, anionic surfactants or a mixture of such surfactants salts of aliphatic monoesters of sulphuric acid including but not limited to sodium lauryl sulphate; sulfoalkylamides and salts thereof including but not limited to N-methyl-N-oleoyltaurate Na salt; alkylarylsulfonates including but not limited to alkylbenzenesulfonates; alkylnaphthalenesulfonates and salts thereof and salts and esters of sulfosuccinic acid. In an embodiment, the wetting agent includes a blend comprising an alkali metal salt of alkylnaphthalenesulfonate or an alkali metal salt of sulfosuccinic acid or a combination thereof According to another embodiment of the present invention, the dispersing agent is selected from, but not limited to salts of polystyrenesulphonic acids, salts of polyvinylsulphonic acids, salts of naphthalenesulphonic acid/formaldehyde condensates, salts of condensates of naphthalenesulphonic acid, phenolsulphonic acid and formaldehyde, and salts of lignosulphonic acid, polyethylene oxide/polypropylene oxide block copolymers, polyethylene glycol ethers of linear alcohols, reaction products of fatty acids with ethylene oxide and/or propylene oxide, furthermore polyvinyl alcohol, polyvinylpyrrolidone, copolymers of polyvinyl alcohol and polyvinylpyrrolidone and copolymers of (meth) acrylic acid and (meth)acrylic esters, furthermore alkyl ethoxylates and alkylarylethoxylates. The preferred dispersing agents include sodium naphthalene sulfonate-formaldehyde condensate, alkyl naphthalene sulfonate or a combination thereof.

In an embodiment of the present invention the defoamer is selected from but not limited to powders and emulsions based on polydimethylsiloxane.

In another embodiment of the present invention the viscosity modifier is selected from polysaccharides.

According to another embodiment of the present invention, there is provided a method of killing and/or controlling the pest, using a composition comprising a dithiocarbamate or a derivative or a salt thereof, a polycarboxylate salt and optionally another active ingredient selected from pesticides and/or a plant growth regulator and/or a micronutrient by applying it to a plant, its habitat, plant seed or soil in an agrochemically effective amount.

According to another embodiment of the present invention, there is provided a method of treating fungal infestation using compositions of the present invention comprising a dithiocarbamate, a derivative or salt, a polycarboxylate salt and optionally a pesticide and/or a plant growth regulator and/or a micronutrient by applying it to a plant, its habitat, plant seed or soil in an agrochemically effective amount.

In another embodiment, the combination of the present invention can be presented in the form of a multi-pack fungicidal product or as a kit-of-parts for fungicidal treatment of plants. In an embodiment of the multi-pack fungicidal product, the polycarboxylate salt can be contained in a separate container or it can be contained in the same container.

Preferably, when the polycarboxylate salt is contained in a separate container, the multi-pack fungicidal product includes an instruction manual instructing an user to admix the polycarboxylate with dithiocarbamate.

According to another embodiment, the multi-pack fungicidal product optionally comprises containers containing other agents selected from pesticides, plant growth regulator, micronutrient and agrochemical adjuvants/surfactants before application.

Accordingly, in a preferred embodiment, the present invention provides a multi-pack fungicidal product, comprising:
a) a first container containing a dithiocarbamate, derivative or salt thereof;
b) a second container containing a polycarboxylate salt;
c) optionally a third container containing other agrochemical adjuvants/surfactants; and
d) an instruction manual instructing an user to admix said ingredients before application.

The invention shall now be described with reference to the following specific examples. It should be noted that the examples appended below illustrate rather than limit the invention and that those skilled in the art will be able to design many alternative embodiments without departing from the scope of the present invention.

EXAMPLES

Example 1

A formulation of mancozeb (75%) and polycarboxylate according to the present invention was prepared as follows:

| Sr. No. | Ingredient | Quantity (g) |
| --- | --- | --- |
| 1 | Mancozeb Technical 85% | 88.0 |
| 2 | Sodium lignosulfonate | 8.0 |
| 3 | Polycarboxylate | 1.0 |
| 4 | Sodium Lauryl sulfate | 2.5 |
| 5 | Defoamer | 1.0 |
| 6 | Water | <2 |

Process:

The required quantities of mancozeb along with polycarboxylate, sodium lauryl sulfate, defoamer and sodium lignosulfonate were blended with water to obtain slurry. The slurry was spray-dried to get granules. The granules were dried to obtain granules with moisture content less than 2%.

Example 2

A formulation of mancozeb (70%)+ azoxystrobin (5%) and polycarboxylate according to the present invention was prepared as follows:

| Sr. No. | Ingredient | Quantity (g) |
| --- | --- | --- |
| 1 | Mancozeb Technical purity 85% | 83.0 |
| 2 | Azoxystrobin | 5.0 |
| 3 | Sodium lignosulfonate | 8.0 |
| 4 | Polycarboxylate | 2.0 |
| 5 | Sodium Lauryl sulfate | 2.5 |
| 6 | Defoamer | 1.0 |
| 7 | Water | <2 |

Process:

The required quantities of mancozeb along with polycarboxylate, sodium lauryl sulfate, defoamer and sodium lignosulfonate were blended with water to obtain slurry. Second slurry of azoxystrobin was prepared and mixed with the first slurry. The mixture was then spray-dried to get granules. The granules were dried to obtain granules with moisture content less than 2%.

Example 3

A formulation of mancozeb (40%)+ azoxystrobin (5%) and polycarboxylate according to the present invention was prepared as follows:

| Sr. No. | Ingredient | Quantity (g) |
|---|---|---|
| 1 | Mancozeb | 40.0 |
| 2 | Azoxystrobin | 5.0 |
| 3 | Sodium lignosulfonate | 2.0 |
| 4 | Polycarboxylate | 2.0 |
| 5 | Sodium naphthalene formaldehyde condensate | 3.0 |
| 6 | EOPO block co-polymer | 2.0 |
| 7 | Propylene glycol | 7.0 |
| 8 | Viscosity modifier | 0.1 |
| 9 | Biocide | 0.01 |
| 10 | water | 35.0 |

Process:

The required quantities of mancozeb and azoxystrobin were grinded to required particle size and slurry was made with water. The required quantities of other ingredients (sodium lignosulfonate, polycarboxylate, sodium naphthalene formaldehyde condensate, EOPO block co-polymer, propylene glycol and biocide) were added to the slurry and stirred to get a suspension. The required viscosity was attained by adding the viscosity modifier.

Examples prepared according to the invention are listed in Table 1. The samples were analyzed for suspensibility, AHS susepnsibility, and Wet-Sieve Test (WST)

Procedure for Suspensibility Test
As per CIPAC Vol.F MT-184)
Procedure for Wet Seive Test
As per CIPAC Vol.F MT-185

Retention After Rainfall:

Sample was prepared according to Example 1 of the invention and sprayed on banana plants. The upper and the lower leaves were analyzed after 35 mm and 90 mm rainfall for mancozeb retention by using ICP-OES Perkin Elmer Optima 2100 DV. The samples of the present invention were tested against a sample prepared according to the patent EP 0950354 with polyvinyl acetate (PVA).

Table 2 summarizes the results of the analysis. Percentage retention of mancozeb is determined from the mean value of mancozeb retained on both the upper and the lower leaves.

TABLE 2

% Mancozeb rainfatsness with varied % of polycarboxylate

| Sample | % Mancozeb after 35 mm rainfall |
|---|---|
| Mancozeb + 2% polycarboxylate | 28.34 |
| Mancozeb + 4% polycarboxylate | 34.39 |
| Mancozeb + PVA* | 23.81 |

*the sample is prepered as per EP 0950354

From the above table it was evident that formulations comprising mancozeb and polycarboxylate salt gives a better rainfastness as compared to samples comprising mancozeb alone as well with other rainfast agents.

Table 3 summarizes the results of analysis of % Mancozeb retained on the leaf after 35 mm and 90 mm rainfall.

TABLE 1

Examples

| Example No. | Active ingredients (%) | Surfactants (%) | Suspensibility (%) | AHS Suspensibility (%) | AHS-WST (%) |
|---|---|---|---|---|---|
| 1 | Mancozeb (66), Azoxystrobin (5) | Polycaroboxylate (1), SLS (2.4), Na lignosulfonate (9.5), defoamer(1) | Mancozeb(60), Azoxystrobin(65) | Mancozeb(60), Azoxystrobin(65) | 0.6 |
| 2 | Mancozeb (68), Azoxystrobin (5) | Polycarboxylate(0.5), SLS(2.4), Ufoxane (9.53) | Mancozeb(66.96), Azoxystrobin(76.83) | Mancozeb(63.23), Azoxystrobin(78.19) | 0.6 |
| 3 | Mancozeb (61), Azoxystrobin (5) | Polycarboxylate(0.3), Ufoxane(11), SLS(2) | Mancozeb(78.89) Azoxystrobin(79.34) | Mancozeb(64.5%) Azoxystrobin(61.9%) | 0.7 |
| 4 | Mancozeb(71) Azoxystrobin (5.5) | Polycarboxylate(0.4), SLS(2.4), Reax M 100(8.20), SAG(1) | Mancozeb(82.41), Azoxystrobin(81.57) | Mancozeb(70.86), Azoxystrobin(80.70) | 0.7 |
| 5 | Mancozeb(66) Azoxystrobin (8.5) | Polycarboxylate(0.2), SLS(3), Reax M 100(9.20), SAG(1) | Mancozeb(80.50), Azoxystrobin(78.20) | Mancozeb(75.56), Azoxystrobin(75.60) | 0.8 |
| 6 | Mancozeb(63) Carbendazim (12) | Polycarboxylate(0.5), sodium salt of alkyl aryl sulfonate(2.0), sodium salt of alkyl naphthalene sulfonate(2.0), inert(9.0) | Mancozeb(75.0) Carbendazim (80.0) | Mancozeb(70.0) Carbendazim (78.1) | 0.6 |
| 7 | Mancozeb(62) Zn-EDTA(13) | Polycarboxylate(0.4,) SLS(2.4), Ufoxane(8.20), SAG(0.5) | Mancozeb(77.0) | Mancozeb(70.0) | 0.7 |

TABLE 3

Rainfastness after 35 mm and 90 mm rainfall

| Sample | % Mancozeb after 35 mm rainfall | % Mancozeb after 90 mm rainfall |
|---|---|---|
| Example 1 | 38.1 | 18.4 |
| Mancozeb + PVA* | 28.30 | 14.30 |
| Example 1 without rainfastness agent | 24.90 | 12.57 |
| Mancozeb + hydroxyl alkyl cellulose** | 32.0 | 16.8 |

*the sample was prepered as per EP 0950354,
**the sample was prepered as per EP0245970

From the above table it was found that samples prepared according to the present invention exhibited better rainfastness. The sample prepared as per EP0245970 was found to have rainfastness properties. However, the formulation suffered from severe flocculation problems and hence it was not suitable for commercial purpose.

Rainfastness of Mancozeb and Azoxystrobin Composition

Sample prepared according to Example 2 was tested in a rain simulator for rainfastness of mancozeb and azoxystrobin. Rainfastness in mancozeb is defined as the % of applied pesticide which remains on the crop after a certain amount of rain. Different leaves like Banana, Tomato and Citrus were used for testing. The leaves were sprayed with 1% suspension and tested after 8 mm rainfall. Mancozeb on leaf surface was analysed and azoxystrobin was analysed in the collected water. Table 4 summarizes the results.

TABLE 4

Rainfastness of Mancozeb + Azoxystrobin composition

| | Banana | | Tomato | |
|---|---|---|---|---|
| Sample | % Mancozeb | % Azoxystrobin | % Mancozeb | % Azoxystrobin |
| Example 2 | 35 | 29.0 | 20 | 33 |
| Mancozeb + Azoxystrobin* | 19.0 | 27.0 | 13 | 18 |

*Prepared according to CN101779645

From the above data it was found that formulations comprising mancozeb, azoxystrobin and polycarboxylate salt gives a better rainfastness as compared to sample without polycarboxylate salt.

Control of Early & Late Leaf Blight Diseases in Tomato (*Solanum lycopersicum*)

Product efficacy was recorded by tagging five plants in each treatment sub-plot. The tagged plants were observed throughout the season, pre and post application of product. Following factors were taken into consideration for result derivation-leaf spots or concentric rings/leaf lesions or water soaked spots on lower leaf & upper leaf.

Water dispersible granules were prepared according the invention. The sample prepared according to Example 2 was tested in the field for fungicidal effect against early & late leaf blight diseases in tomato (*Solanum lycopersicum*). The samples were sprayed at a water volume of 500 L/Ha. The products were applied at 1.5 Kg/Ha and 2.0 Kg/Ha Table 5 summarises the samples that were tested and Table 6 summarises results of % disease control days after treatment. Observations were recorded after 7 days, 15 days, 21 days, 28 days and 35 days.

TABLE 5

Samples used for field trial

| Sample | Details |
|---|---|
| A | Mancozeb 70 + Azoxystrobin 5% WDG with polycarboxylate salt @ 1.5 kg/Ha |
| B | Mancozeb 70 + Azoxystrobin 5% WDG without polycarboxylate salt @ 1.5 kg/Ha |
| C | Mancozeb 70 + Azoxystrobin 5% WDG with polycarboxylate salt@ 2.0 kg/Ha |
| D | Mancozeb 70 + Azoxystrobin 5% WDG without polycarboxylate salt @ 2.0 kg/Ha |
| E | Untreated Control |

TABLE 6

% Disease control

| Sample | 7 D % Disease control | 15 D % Disease control | 21 D % Disease control | 28 D % Disease control | 35 D % Disease control |
|---|---|---|---|---|---|
| A | 80.51 | 50.82 | 50.82 | 53.37 | 57.01 |
| B | 45.20 | 28.15 | 25.28 | 4.98 | 22.09 |
| C | 82.95 | 67.95 | 67.95 | 77.34 | 78.67 |
| D | 47.53 | 30.89 | 30.89 | 47.97 | 47.40 |
| E | 0.00 | 0.00 | 0.00 | 0.00 | 0.00 |

From the above data it was found that the formulations comprising polycarboxylate salt with mancozeb and azoxystrobin gave better disease control. It has further been observed that at a dosage of 2.0 kg/Ha of composition of the present invention, the disease control was high and a consistant disease control was observed compared to samples which do not contain a polycarboxylate salt.

The invention claimed is:
1. A solid agrochemical composition comprising
   (a) mancozeb in an amount of 30% to 75% by weight of the composition,
   (b) a second fungicide which is a strobilurin fungicide selected from azoxystrobin, fluoxastrobin, coumoxystrobin, picoxystrobin, dimoxystrobin, orysastrobin, pyraclostrobin, kresoxim-methyl, and trifloxystrobin, wherein said strobilurin fungicide is present in an amount from about 1% to 40% by weight of the composition, and
   (c) about 0.01 to 5% by weight of the composition of a homopolymer of maleic acid sodium salt or a homopolymer of maleic acid potassium salt.
2. The composition according to claim 1, further comprising a micronutrient selected from the group consisting of compounds of zinc, molybdenum, copper, boron, calcium, manganese, iron and magnesium.
3. The agrochemical composition of claim 1, wherein the agrochemical composition has an improved rainfastness compared to a control composition without the polymer of maleic acid sodium salt or a polymer of maleic acid potassium salt, wherein rainfastness is measured as the % of the dithiocarbamate remaining after the sample is sprayed onto banana leaves and exposed to 35 mm or 90 mm of rainfall.
4. A method of killing and/or controlling pests, the method comprising applying to a plant or its habitat, plant seed or soil an agrochemically effective amount of an agrochemical composition according to claim 1.
5. A method of killing and/or controlling pests, the method comprising applying to a plant or its habitat, plant seed or soil an agrochemically effective amount of an agrochemical composition according to claim 2.

\* \* \* \* \*